July 31, 1962  R. F. DEHN  3,047,681
CURRENT COLLECTOR
Filed Aug. 19, 1959  3 Sheets-Sheet 1
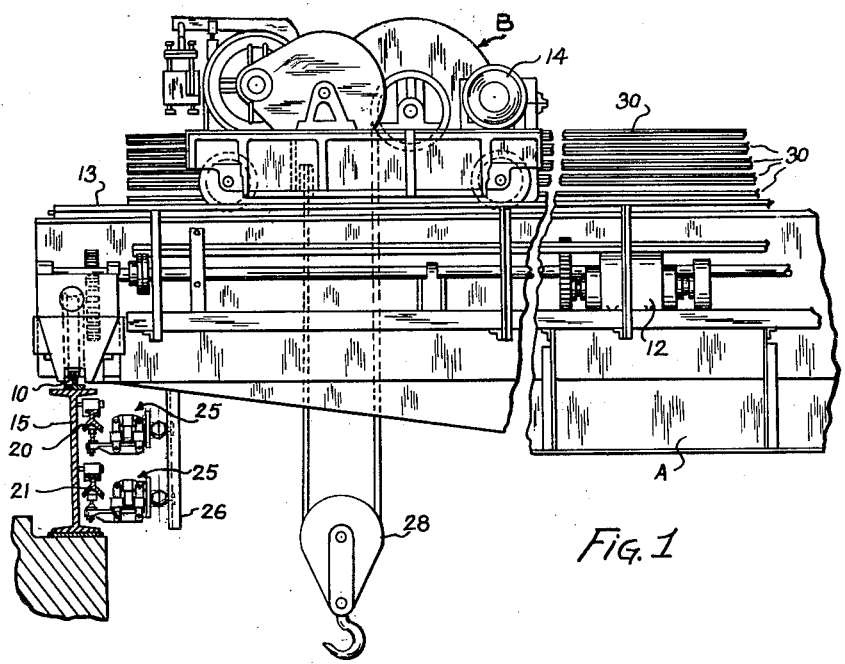
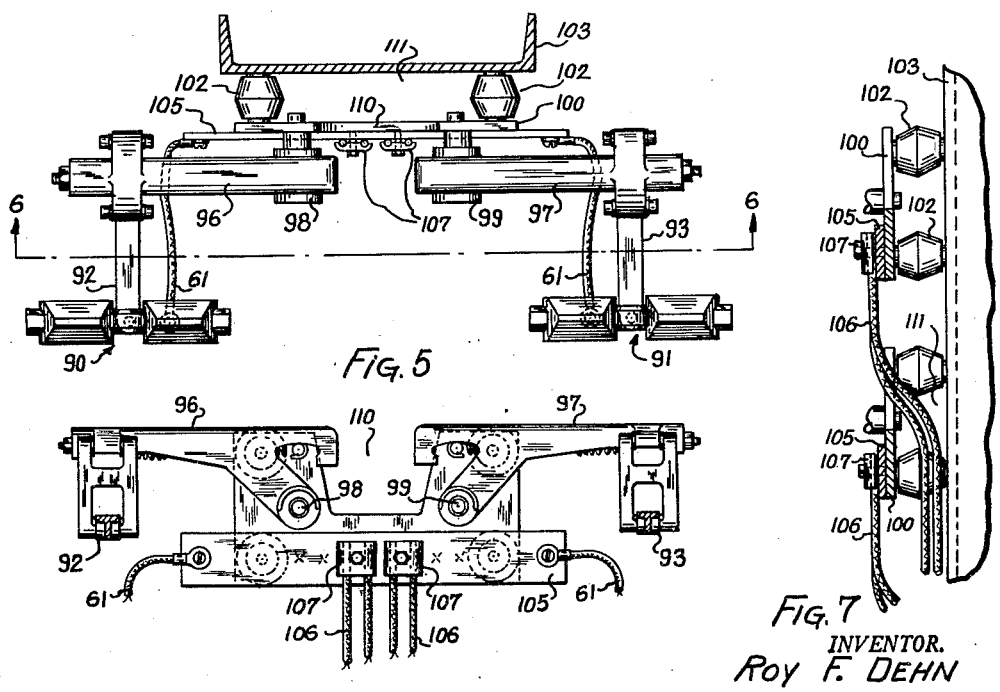
INVENTOR.
Roy F. DEHN
BY Hudson, Boughton,
Williams, David & Hoffmann
ATTORNEYS July 31, 1962 R. F. DEHN 3,047,681
CURRENT COLLECTOR
Filed Aug. 19, 1959 3 Sheets-Sheet 2
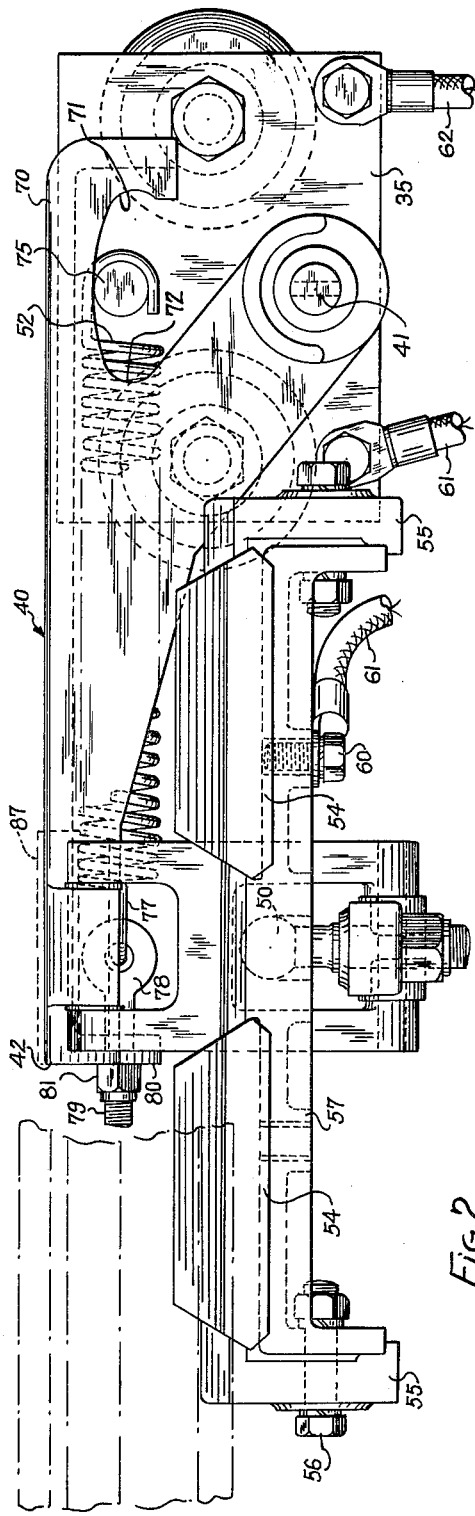
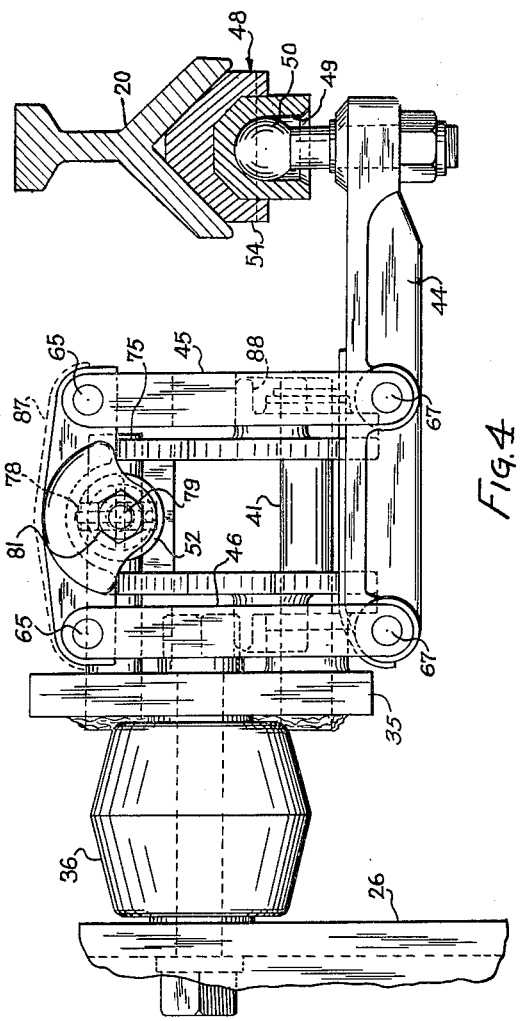
INVENTOR.
Roy F. Dehn
BY Hudson, Boughton,
Williams, David & Hoffmann
ATTORNEYS

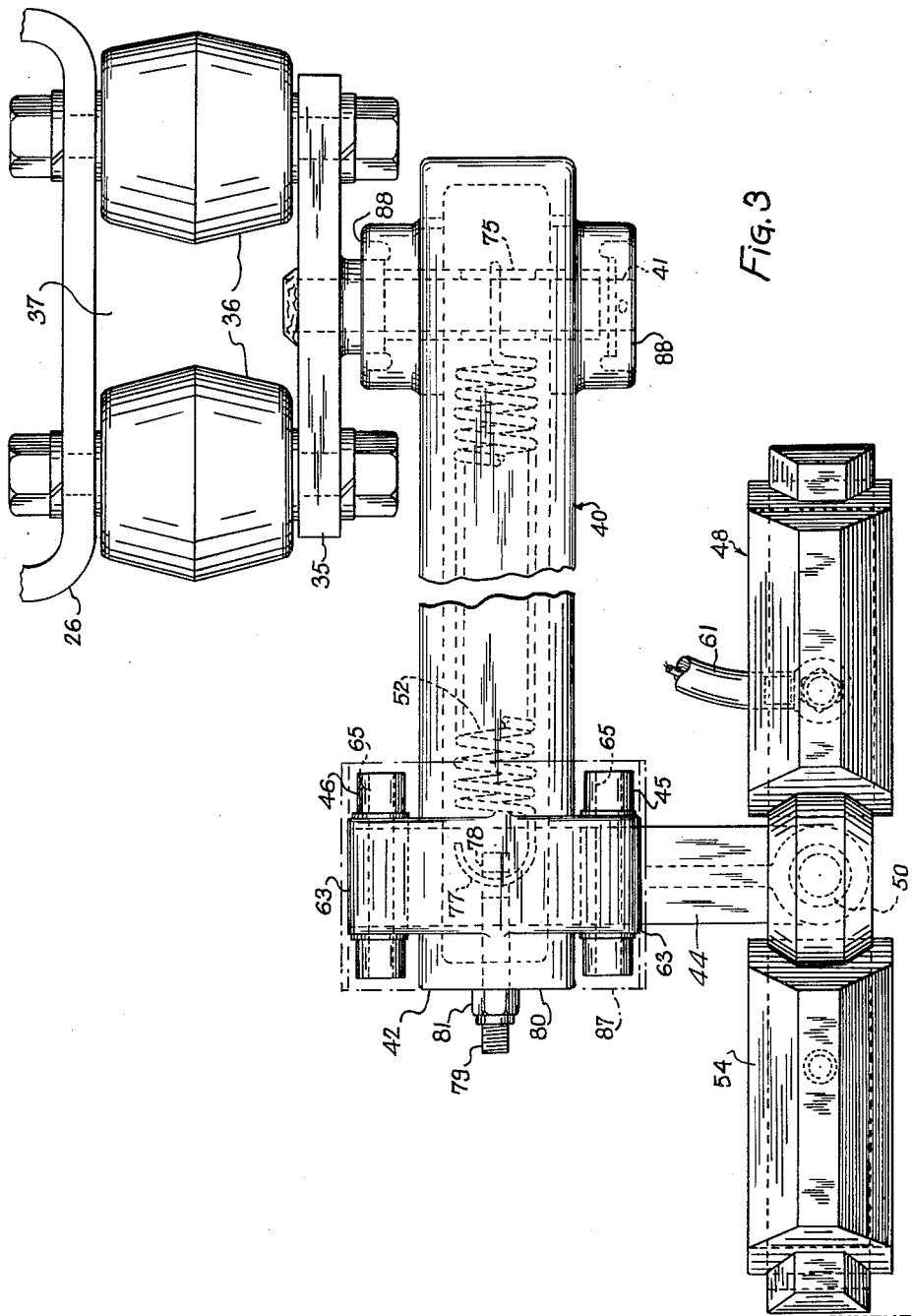

United States Patent Office 3,047,681
Patented July 31, 1962

3,047,681
CURRENT COLLECTOR
Roy F. Dehn, Wickliffe, Ohio, assignor to The Cleveland Crane & Engineering Company, Wickliffe, Ohio, a corporation of Ohio
Filed Aug. 19, 1959, Ser. No. 834,824
3 Claims. (Cl. 191—45)

This invention relates to electrification systems such as are employed, for example, on electrified material handling apparatus including overhead traveling cranes, monorail carrier systems, wherein current is conducted to or from a movable contact or collector means in engagement with and movable along an elongated conductor bar, and to current collector means of such a system which are particularly adapted for close stacking or vertical spacing thereof and the conductor bars with which they co-operate from one another in systems employing a plurality of vertically spaced conductor bars.

One object of the invention is the provision of a new and improved overhead crane having an electrical distribution system so constructed and arranged that the current collectors thereof will readily follow the conductor bars although the conductor bars be close to the crane or trolley of which the collectors are a part, and which system will be free of likelihood of the collectors short circuiting against one another or the conductor bars although closely vertically spaced or stacked either above or below one another.

Another object of the invention is the provision of a new and improved electrical distribution system comprising a rod-like conductor bar having a groove in one side adapted to receive and be engaged by a current collector moved therealong and a current collector assembly comprising a collector shoe or contactor supported for engagement with the conductor bar by means offset transversely of the conductor bar and permitting movement in two directions generally normal to one another and to the length of the conductor bar in combination with means for biasing the collector shoe or contactor into engagement with the conductor bar.

Another object of the invention is the provision of a current collector having the contactor or shoe supported for engagement with a conductor bar for movement in two directions generally normal to one another and to the length of the conductor bar by spring biased arm means supported for movement about an axis extending transversely of the length of the conductor bar and means connected to the arm means at a point spaced from its pivot for movement lengthwise of said axis. The collector also preferably comprises means for adjusting the force of engagement of the contactor or shoe with the conductor bar and stop means for limiting the travel of the swinging arm means in the event the contactor or shoe jumps free, or is otherwise dislodged from, the conductor bar or in the event the biasing means breaks, so as to prevent contact thereof with other elements of the system which may have a reverse, or different, phase or polarity.

Another object of the invention is to provide a collector assembly of the above mentioned character comprising two individual contactors or shoes supported by their respective swinging arm means etc. from a common base which has a clearance gap or opening therein for passing conductor cables to another closely vertically spaced dual collector assembly without interference with the operation of either collector assembly.

The invention resides in certain constructions and combinations and arrangements of parts and further objects and advantages thereof will be apparent to those skilled in the art to which the invention relates from the following description of the preferred embodiments thereof described with reference to the accompanying drawings forming a part of this specification in which similar reference characters designate corresponding parts, and in which:

FIG. 1 is a partial side elevational view, with portions broken away, of a traveling crane embodying the present invention;

FIG. 2 is an enlarged side elevation of the upper current collector means shown in FIG. 1;

FIG. 3 is a plan view of the collector means of FIG. 2;

FIG. 4 is an end view of the collector means of FIG. 2 with some parts in section;

FIG. 5 is a plan view of a modification of the collector means shown in FIGS. 1 to 4.

FIG. 6 is a side elevation, partly in section, of the collector means of FIG. 5, taken along line 6—6 thereof, and FIG. 7 is a fragmentary end view of vertically stacked collector means of FIGS. 5 and 6 and their respective power cables.

Although this invention may be embodied in various electrified equipment and is susceptible of various modifications and constructions it will be herein illustrated and described as embodied in a traveling crane of the type ordinarily employed for moving heavy objects from place to place. A portion of such a crane is illustrated in FIG. 1 and comprises a movable bridge A, supported upon a plurality of parallel rails one of which is indicated at 10, and adapted to be traveled therealong by a reversible electric motor 12 commonly called the "bridge motor." A trolley generally indicated at B is supported upon rails 13 carried by the bridge A and is movable longitudinally of the bridge by a reversible electric motor 14. The rails 10 are supported by structural beams or members 15 which are in turn supported by the building in which the crane is employed.

Either or both of the structural members or beams 15 support one or a plurality of vertically spaced or stacked conductor bars connected thereto by suitable insulating means. Two such conductor bars 20, 21 are supported or carried by the member or beam 15 shown. Each of the conductor bars is of the inverted capital Y type and have current collector assembly 25 associated therewith. In the embodiment shown the collector assemblies are carried by the crane being connected to a depending vertical support member 26 connected to the bridge A. The conductor bars and the collector assemblies provide the medium through which electric current is conducted to the bridge for operating the bridge, trolley and hoist motors, etc.

The trolley motor 14, and the various hoist and other operating motors carried by the trolley B are supplied with current from the bridge A through a plurality of vertically stacked conductor bars 30 connected to and extending lengthwise of the bridge and each of which has a collector assembly in association therewith and supported from the trolley B. The collector assemblies associated with the conductor bars 30 are not shown but are preferably similar to the collector assemblies 25.

The upper collector assembly 25 is illustrated in FIGS. 2 through 4 and is shown in association with the inverted Y bar conductor 20 which is shown in dot-and-dash lines. The particular construction of collector assembly 25 and conductor bar provides a means for completing electric circuits between such conductor bars and a movable member such as the crane bridge A wherein the conductor bars are disposed close to the collector assembly support member, while being capable of assimilating variations in spacing without likelihood of destroying or lessening their circuit completing efficiency or effectiveness.

Each collector assembly 25 comprises first a base member or plate 35 which is secured or supported with respect to the vertical support member 26 by means of suitable insulators 36, which prevent current passing directly between the base plate and the support member 26 and also provide a space or opening 37 therebetween through which power or conductor cables may be connected thereto without interference with the operation thereof.

A swinging arm or second member 40 is pivoted at one end thereof to the base member 35 for movement about the axis of a pin or shaft 41 which pivotal axis is substantially normal to and in line with the conductor bars 20 with which the collector assembly 25 is associated. The free or opposite end 42 of the arm 40 forms a part of a pantograph linkage for supporting an elongated support member 44 which extends substantially parallel to the above mentioned axis of the pin 41 about which the arm 40 is adapted to pivot. The support member 44 together with a pair of pantograph links 45 and 46 constituting a third member complete the above mentioned pantograph linkage.

A collector shoe or contactor or fourth member generally indicated as 48 is supported at the outer end of the support member 44 and is attached thereto by a universal joint which in this instance is illustrated as taking the form of a ball and socket arrangement, including the socket member 49 and an associated ball member 50. This ball and socket arrangement provides a universal connecting means for pivotally connecting the collector shoes to the support member 44 for free rotation.

A tension or extension spring 52 is connected between the swinging arm 40 and the base member 35 in a manner presently described and serves to bias the swinging arm about the pivotal axis of pin 41 thereby maintaining the contactor 48 in engagement with the conductor bar 20. The pantograph links 45 and 46 permit the contactor 48 to shift transversely of the length of the conductor bar 20 whereby variations in the spacing between the conductor bar and the vertical support member 26 are accommodated eliminating excessive wear between the contactor and conductor bar and eliminating any likelihood of the former becoming disengaged from the latter.

The contactor 48 comprises a pair of collector shoe elements 54 replaceably connected by means including end clamps 55 and bolts 56, to a shoe supporting member 57 of which the universal joint socket 49 forms a part. The end clamps 55 are advantageously made of a material softer than that of the conductor bars to preclude scoring of the latter in the event the replaceable collector shoes or elements 54 become worn and are not replaced soon enough.

The member 57 of the contactor 48 has secured thereto, as by a screw 60, a shunt cable 61 leading and secured to the base plate 35. The shunt cable 61 provides a low resistance electrical connection between the collector elements 54 and the base plate 35 and no current need flow through the various pivotal and moving parts of the collector asssembly. A power supply cable 62 is secured to the base plate 35 and serves to conduct current between the collector assembly and the crane bridge A.

As best illustrated in FIG. 3, the end 42 of the swing arm 40 is provided with laterally extending ears or bosses 63 to which the pantograph links 45 and 46 are pivotally connected as by pins 65. The links 45 and 46 are conveniently made in the form of H-members and are pivoted at their lower ends to the support member 44 as by pins 67. The pins 67 are spaced the same distance part as are the pins 65, and the arm 40, links 45, 46 and support member 44 form a parallelogram, or what is commonly referred to as a pantograph linkage, for permitting the movement of the support arm 44 in the manner previously described.

The swing arm 40 has an extension 70 presenting a pair of abutment surfaces 71 and 72 which are spaced from one another and are radially spaced with respect to the axis of the pins 41. The abutments 71, 72 are also disposed to opposite sides of a stop pin 75 extends from the base plate 35 with which they are adapted to cooperate to limit the rotation or swinging of the arm 40 about its pivotal axis. The spring 52 has one end 77 connected with an adjusting eye bolt 78 having its threaded end 79 extending through an end wall 80 of the arm 40 and retained by an adjusting nut 81. The spring 52 is, at its other end, connected to the stop pin 75 and normally urges the arm 40 to rotate about its pivotal axis 41 in a clockwise or upward direction as viewed in FIG. 2.

The biasing action of the spring 52 on the arm 40 maintains the contactor 48 in engagement with the conductor bar 20 with a predetermined force and assures continual engagement although the vertical positioning of the conductor bar may vary throughout its length. The tension or force with which the spring so biases the contactor 48 against the conductor bar 20 may be conveniently adjusted by moving the adjusting nut 81 along the threaded portion 79 of the eye bolt 78, thereby assuring maximum effective contact with the least practicable wear of the shoe elements 54.

The stop or limiting action of the stop pin 75 and associated abutment surfaces 71 and 72 permits adequate movement of the arm 40 to assure effective tracking by the collector assembly, and is effective to prevent the swing arm 40 or the associated pantograph linkage and contactor 48 from short circuiting against other conductor bars or current collector assemblies when they are stacked in closely spaced vertical relation to one another in the event the collector 48 becomes dislodged from the conductor bar 20 and is moved upwardly by the spring 52, or in the event the spring 52 should break or otherwise fail permitting the arm 40 to drop.

In order to assure that the current between the contactor 48 and the base plate 35 is carried only by the shunt cable 61, the pivot pin 41 of the arm 40, as well as the pins 65, 67, may be conveniently provided with insulating bushings, thereby preventing undue arcing and consequent wear, particularly in the event of failure of the shunt cable. To further protect the collector assembly, dust covers 87 may be fitted as indicated in dotted lines in FIGS. 2–4, and protective projections or "eyebrows" 88 may be provided over the pivot pin 41.

A current collector assembly of modified construction is illustrated in FIGS. 5–7. This current collector assembly is substantially the same as that previously described but has dual sets of collector shoes or contactors 90, 91, support members 92, 93 and swing arms 96, 97 pivoted as at 98, 99 to a common base member or plate 100. The base plate 100 is mounted by insulators 102 to a vertical support member 103 corresponding to the support member 26 previously referred to.

The swing arms 96, 97 are like those previously described, however one is arranged to be biased in one direction of rotation and the other in a reverse direction of rotation. The shunt cables 61 are conveniently connected to a bus bar 105, and a plurality of power cables 106 are held by clamps 107 in contact with that buss bar.

The base plate 100 is provided with an opening or gap 110 between the swing arms 96, 97, as is best illustrated in FIG. 7. The gap 110 permits the cables 105 of closely and vertically stacked ccollector assemblies to be led through a space 111 between the vertical support 103 and a base plate 100 without interference with the swing arms, pantograph linkages, and contactors thereof.

The current collector assembly just described may be used either to provide a safety factor or to double the current rating of the collector assembly without changing the size or spacing of the vertically stacked conductor bars 20.

From the foregoing description and from the accompanying drawings it will be readily appreciated that the objects hereinbefore enumerated have been accomplished and that there has been provided a novel and improved electrification system having conductor bars and current collector assemblies in which the conductor bars and current collector assemblies can be closely stacked or vertically spaced without interference and in with the current collectors have the ability to follow the conductor bars and take up both vertical and horizontal variations in the positions thereof.

While the invention have been described in considerable detail and with reference to specific constructions embodying the invention, it is understood that the invention is not limited to the particular constructions shown, but rather the invention includes all adaptations, changes and modifications as are reasonably embraced by the scope of the following claims.

Having thus described my invention, I claim:

1. In a current collector device, first and second contactor means adapted to engage and travel along a conductor bar, first and second support members having connected thereto said first and second contactors respectively, a base member, said support members connected to said base member by first and second swinging arm means and pantograph linkages, said swinging arm means each being pivoted to said base member and said pantograph linkages connecting said first and second support members to said first and second swinging arm means respectively, bus bar means on said base member, shunt conductors connecting said contactors to said base member, said base member comprising a plate adapted to be mounted on and in spaced relation to supporting means by insulating means, said plate having an opening for passing power conductors from an adjacent collector device between said base member and said supporting means.

2. A current collector device as defined in claim 1 and including stop means on each swinging arm means for limiting movement thereof with respect to said base member, adjustable biasing means urging said contactor means into engagement with said conductor bar, and wherein said opening is disposed between said first and second swinging arm means.

3. In a device of the character described, a first member, an elongated second member, means pivotally connecting said second member to said first member, an elonagted coil-type tension spring offset from the said pivotal connection and extending generally lengthwise of said second member in a plane parallel thereto and having one end connected to said first member and the other end connected to said second member for yieldably biasing said second member in a first direction about the axis of said pivotal connection and permitting movement of said second member in said first direction and in a second direction opposite said first direction, cooperating abutment means on said members co-acting with one another for preventing movement of said second member about said axis in both said first and second directions after said second member moves a predetermined amount in said first or said second direction, a third member, means connecting said third member to said second member at a point spaced from said axis of said pivotal connection between said first and second members for movement in a direction generally lengthwise of said axis, and a fourth member supported by said third member to engage a conductor bar.

References Cited in the file of this patent

UNITED STATES PATENTS

| | | |
|---|---|---|
| 766,625 | Jenkins | Aug. 2, 1904 |
| 1,817,093 | Morgan | Aug. 4, 1931 |
| 1,864,026 | Moore | June 21, 1932 |
| 2,049,403 | Wolfe | July 28, 1936 |
| 2,358,116 | Wehr | Sept. 12, 1944 |
| 2,422,132 | Saiter | June 10, 1947 |
| 2,508,176 | Langer | May 16, 1950 |
| 2,640,114 | Wehr | May 26, 1953 |
| 2,700,705 | Anjeskey et al. | Jan. 25, 1955 |
| 2,756,289 | Taylor | July 24, 1956 |
| 2,824,911 | Taylor | Feb. 25, 1958 |
| 2,935,576 | Faiveley | May 3, 1960 |

FOREIGN PATENTS

| | | |
|---|---|---|
| 205,546 | Austria | Oct. 10, 1959 |
| 5,249 | Great Britain | Mar. 4, 1909 |